US009338084B2

(12) United States Patent
Badoni et al.

(10) Patent No.: US 9,338,084 B2
(45) Date of Patent: May 10, 2016

(54) DISTRIBUTED FAST REMOTE CUTOVER OF TRAFFIC UPON LOCAL FAILURE IN AN OVERLAY TRANSPORT VISUALIZATION NETWORK

(71) Applicant: Cisco Technology, Inc., San Jose, CA (US)

(72) Inventors: Gaurav Badoni, San Jose, CA (US); Dhananjaya Rao, Milpitas, CA (US); Hasmit Grover, Fremont, CA (US); Senthil Kenchiah, Dublin, CA (US); Victor Moreno, Carlsbad, CA (US)

(73) Assignee: Cisco Technology, Inc., San Jose, CA (US)

( * ) Notice: Subject to any disclaimer, the term of this patent is extended or adjusted under 35 U.S.C. 154(b) by 303 days.

(21) Appl. No.: 13/964,327

(22) Filed: Aug. 12, 2013

(65) Prior Publication Data

US 2014/0307541 A1    Oct. 16, 2014

Related U.S. Application Data (60) Provisional application No. 61/810,312, filed on Apr. 10, 2013.

(51) Int. Cl.
*H04L 12/703* (2013.01)
*H04L 12/721* (2013.01)

(52) U.S. Cl.
CPC ............... *H04L 45/28* (2013.01); *H04L 45/12* (2013.01)

(58) Field of Classification Search
None
See application file for complete search history.

(56) References Cited

U.S. PATENT DOCUMENTS

| | | | | |
|---|---|---|---|---|
| 7,710,902 | B2 * | 5/2010 | Vasseur | H04L 12/4633 370/228 |
| 8,339,996 | B2 * | 12/2012 | Wijnands | H04L 12/18 370/256 |
| 2002/0010798 | A1 * | 1/2002 | Ben-Shaul | G06F 17/3089 709/247 |
| 2003/0142674 | A1 * | 7/2003 | Casey | H04L 12/4633 370/393 |
| 2005/0114495 | A1 * | 5/2005 | Clemm | H04L 29/12009 709/224 |
| 2006/0080421 | A1 * | 4/2006 | Hu | H04L 12/24 709/223 |
| 2008/0123651 | A1 * | 5/2008 | Vasseur | H04L 12/4633 370/392 |
| 2009/0037607 | A1 * | 2/2009 | Farinacci | H04L 12/4641 709/249 |
| 2009/0245248 | A1 * | 10/2009 | Arberg | H04L 45/12 370/390 |
| 2011/0075663 | A1 * | 3/2011 | Serbest | H04L 12/18 370/390 |
| 2012/0201244 | A1 | 8/2012 | Ou et al. | |
| 2012/0300620 | A1 * | 11/2012 | Kothari | H04L 45/68 370/225 |
| 2013/0163594 | A1 | 6/2013 | Sharma et al. | |
| 2013/0198558 | A1 | 8/2013 | Rao et al. | |

* cited by examiner

*Primary Examiner* — Charles C Jiang
*Assistant Examiner* — Kyaw Z Soe
(74) *Attorney, Agent, or Firm* — Edell, Shapiro & Finnan, LLC (57) ABSTRACT

Techniques are presented herein for optimizing traffic routing in overlay networks. At a first edge device located at a first site in a network, a message is received that indicates address information of a network device. The address information of the network device is stored in an address table. The address information is associated with a site identifier that identifies a second site at which the network device is located. The site identifier is mapped to an identifier associated with a second edge device that is responsible for routing traffic to network devices at the second site.

20 Claims, 6 Drawing Sheets

ADDRESS TABLE

202

| VLAN, MAC ADDRESS | SITE IDENTIFIER |
|---|---|
| 100, M1 | S2 |
| 200, M2 | S1 |
| 100, M999 | S2 |
| 100, M1000 | S2 |

| SITE IDENTIFIER | PRIMARY AUTHORITATIVE EDGE DEVICE | BACKUP CANDIDATE AUTHORITATIVE EDGE DEVICE |
|---|---|---|
| S1 | E4 | - |
| S2 | E2 | E1, E3 |

DISTRIBUTED FAST REMOTE CUTOVER OF TRAFFIC UPON LOCAL FAILURE IN AN OVERLAY TRANSPORT VISUALIZATION NETWORK

CROSS REFERENCE TO RELATED APPLICATION

This application claims priority to U.S. Provisional Application No. 61/810,312 filed on Apr. 10, 2013, the entirety of which is incorporated by reference herein.

TECHNICAL FIELD

The present disclosure relates generally to optimizing traffic routing in overlay networks.

BACKGROUND

Overlay networks are virtual networks of nodes and logical links that are implemented over ("on top of") existing networks in order to provide network services that are not available in the existing networks. Communications (e.g., packets) may be exchanged in an overlay network using packet encapsulation techniques that enable routing of packets between subnetworks or "sites" within the overlay network. For example, sites within an overlay network may have Authoritative Edge Devices (AEDs) that are responsible for encapsulating packets to be sent to devices in other, remote sites. The AEDs may also be responsible for decapsulating packets that are received from devices in remote sites. In one example, Overlay Transport Virtualization (OTV) traffic may be sent between sites in an overlay network upon proper encapsulation/decapsulation by AEDs in the respective sites.

DESCRIPTION OF EXAMPLE EMBODIMENTS

Overview

Techniques are presented herein for optimizing traffic routing in overlay networks. At a first edge device located at a first site in a network, a message is received that indicates address information of a network device. The address information of the network device is stored in an address table. The address information is associated with a site identifier that identifies a second site at which the network device is located. The site identifier is mapped to an identifier associated with a second edge device that is responsible for routing traffic to network devices at the second site.

DETAILED DESCRIPTION

Figure 1A:
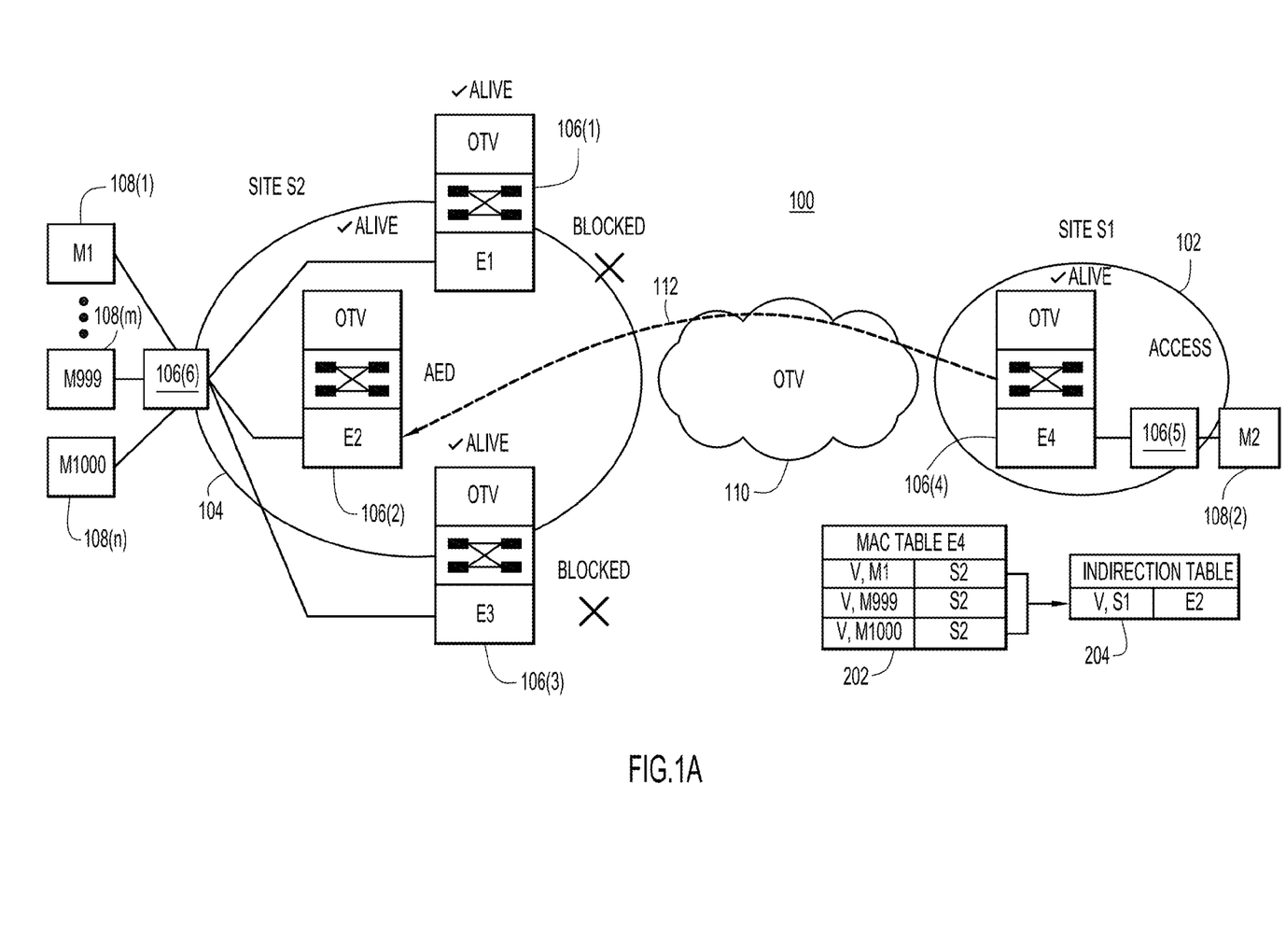
FIGS. 1A-1C show examples of an overlay network depicting enhanced address learning and mapping processes and enhanced traffic flow between network sites via edge devices.
Figure 1B:
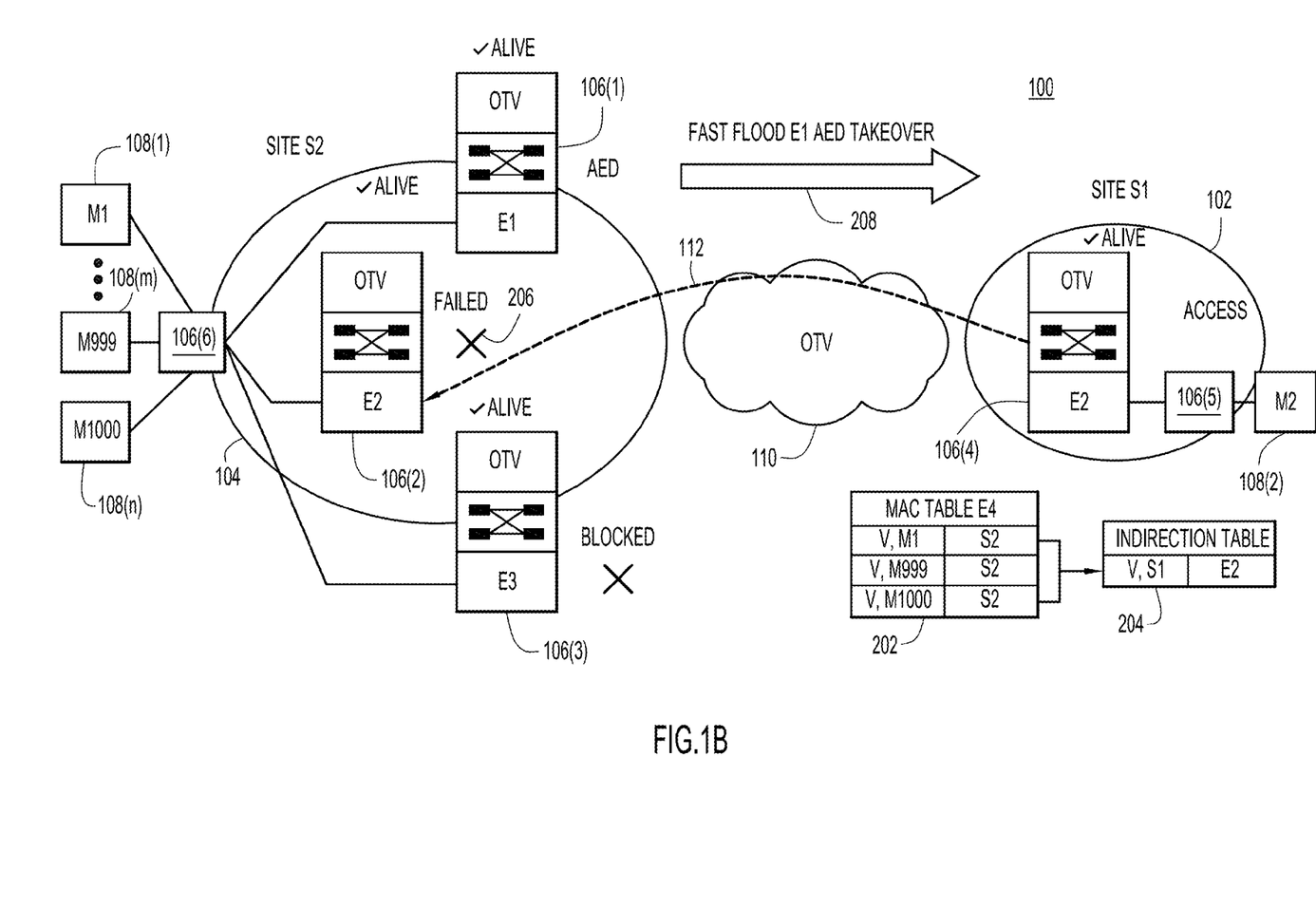
Figure 1C:
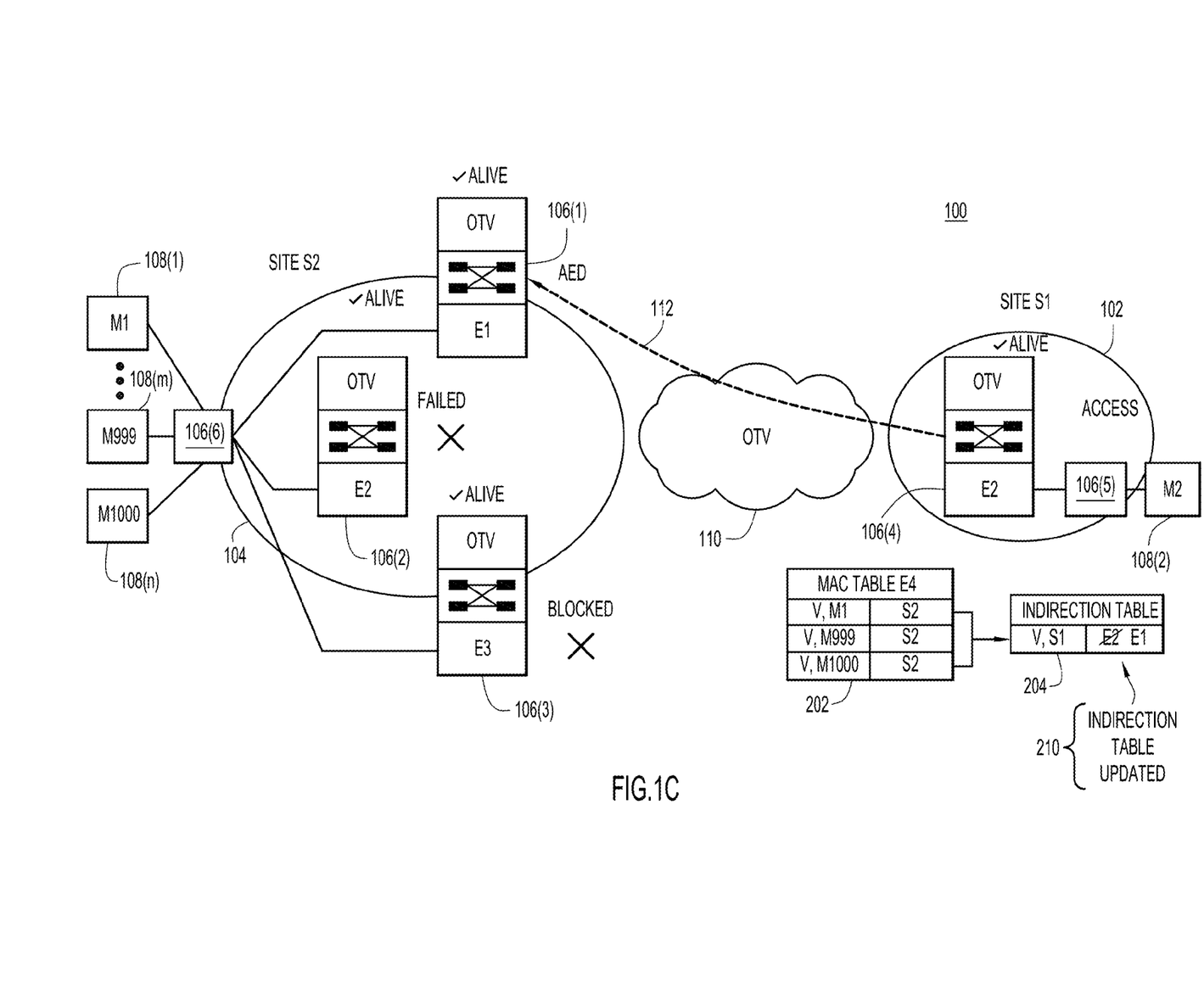

Techniques are presented herein that enable edge devices in an overlay network to participate in enhanced traffic flow. These techniques enable faster, deterministic convergence in overlay networks while minimizing constraints on network scalability. An example topology of an overlay network is shown at reference numeral 100 in FIGS. 1A-1C. FIG. 1A shows the overlay network 100 in an enhanced steady state, FIG. 1B shows the overlay network 100 with a failure event of an edge device, and FIG. 1C shows an example of the overlay network 100 performing enhanced address learning and mapping processes in response to the failure event.

Referring to FIG. 1A, the overlay network 100 comprises a plurality of subnetworks or "sites." FIG. 1A shows two sites: site S1 at reference numeral 102 and site S2 at reference numeral 104. Site S1 and site S2 may themselves be networks (e.g., Local Area Networks (LANs), Wide Area Networks (WANs), etc.). The overlay network 100 in FIG. 1A, thus, may be a network that is comprised of other subnetworks (e.g., site S1 and site S2), each of which comprises network devices and enables traffic to be exchanged between the network devices in the subnetworks. It should be appreciated that the term "subnetwork" and the term "site" may be used interchangeably herein to refer to a network within the overlay network 100.

There are several router devices ("routers") that are distributed in the overlay network 100. The routers are shown at reference numerals 106(1)-106(6) in FIG. 1A, though it should be appreciated that any number of routers may be present in the overlay network 100. In FIG. 1A, routers 106(1)-106(4) are edge router devices ("edge devices") configured to route traffic between sites, while routers 106(5) and 106(6) are non-edge router devices ("non-edge devices") used for routing traffic within sites. For example, FIG. 1A shows the edge router devices 106(1), 106(2) and 106(3) present in site S2 and edge device router 106(4) present in site S1. Additionally, FIG. 1A shows the non-edge router device 106(5) in site S1 and the non-edge router device 106(6) in site S2. FIG. 1A also shows a plurality of network devices at reference numerals 108(1)-108(n). For example, network devices 108(1), 108(m) and 108(n) are present in site S2 and network device 108(2) is present in site S1. Network devices in site S1 are configured to exchange communications (e.g., traffic, packets, etc.) with network devices in site S2 via, e.g., network 110. For example, a communication path between site S1 and site S2 is shown at reference numeral 112.

As stated above, the routers 106(1)-106(4) in FIG. 1A are edge devices. A site may have more than one edge device, as is the case with site S2 in FIG. 1A. Of these edge devices, a limited number of edge devices may be designated as Authoritative Edge Devices or AEDs for each site. In the example shown in FIG. 1A, each site has one AED. Edge device 106(4) (also referred to as "edge device 4" or "E4") is designated as the AED for site S1 and edge device 106(2) (also referred to as "edge device 2" or "E2") is designated as the AED for site S2. The designation/election of E4 and E2 as AEDs for sites S1 and S2, respectively, may occur using traditional Overlay Transport Visualization (OTV) protocol techniques. It should be appreciated that multiple edge devices may be designated as AEDs (e.g., each to manage communications for particular remote sites), and edge devices that are not classified or designated as AEDs may later be reclassified or redesignated as AEDs. Likewise, edge devices that are initially classified as AEDs may later be declassified or redesignated as non-AED edge devices. FIG. 1A shows each site having only one AED as an example.

As stated above, in the overlay network 100, traffic may be exchanged between network devices within a particular site. Traffic may also be exchanged between network devices that are located at different sites. For example, traffic (e.g., packets) exchanged within site S1 may be encapsulated by the AED in site S1 (edge device 4 in FIG. 1A) and may be sent to the AED in site S2 (edge device 2 in FIG. 1A) via the communication path 112 and the network 110. Upon receiving the packet, the AED in site S2 can decapsulate the packet, determine the destination address, and send the packet to the appropriate destination device in site S2 (e.g., the device that corresponds to the destination address). For example, traffic within site S1 may be Open Systems Interconnection (OSI) layer 2 packets. When a packet is received by the AED of site S1, the AED of site S1 encapsulates the layer 2 packet with an OSI layer 3 header for transport to the AED of site S2 over the network 110 (e.g., the Internet). The AED of site S2, upon receiving the encapsulated packet, decapsulates the layer 3 header, and evaluates the layer 2 packet to retrieve the destination address (e.g., a Media Access Control or MAC address) for the packet. The AED of site S2 then routes the layer 2 packet to the appropriate network device such that the packet ultimately reaches its destination. Thus, the overlay network 100 may enable layer 3 traffic to be exchanged between subnetworks in order to deliver layer 2 packets between remote network devices located in different subnetworks.

In general, the traffic in the overlay network 100 may be referred to as OTV traffic. In traditional overlay networks, the AEDs of each site will maintain address information for network devices 108(1)-108(n). That is, an AED of one site may perform address learning techniques that are known or heretofore contemplated in order to obtain the addresses (e.g., MAC addresses) of network devices that are local to it (e.g., that are located in the same site as itself). For example, traditionally, edge device 4 in site S1 may use address learning techniques to obtain the MAC address of local network device 108(2) and edge device 2 in site S2 may use address learning techniques to obtain the MAC addresses of local network devices 108(1), 108(m) and 108(n) in site S2. Upon learning the local MAC addresses, each of the AEDs will send the locally-obtained MAC addresses to each other using, e.g., Intermediate System to Intermediate System ("IS-IS") protocol messages. That is, in the example in FIG. 1A, edge device 4 in site S1 will "inform" edge device 2 in site S2 of the MAC address of network device 108(2), and edge device 2 will "inform" edge device 4 of the MAC addresses of network devices 108(1), 108(m) and 108(n). Edge device 2 and edge device 4 "inform" each other of these MAC addresses through the exchange of IS-IS messages that contain listings of these MAC addresses. Thus, upon receiving an IS-IS message that contains a listing of MAC addresses, an AED of a particular site may be aware that the MAC addresses listed in the IS-IS message are MAC addresses associated with remote network devices located in sites different from its own.

Upon receiving the MAC addresses of the remote network devices, the AEDs will install the MAC addresses in order to maintain an address table for the network devices 108(1)-108 (n) in the overlay network 100. Traditionally, the address table may comprise a list of the network devices and the associated MAC address of each network device. Additionally, the traditional address table may maintain a list of edge device identifiers mapped to each network device to identify the AED of the site in which the network device resides. In other words, an example entry of a traditional address table maintained by an AED may list a MAC address of a network device, an optional indication of whether or not the network device is local or remote to the AED, and an identifier indicating that the AED that is responsible for routing network traffic to and from the network device.

Thus, traditional OTV networks require two phases of MAC address learning by AEDs: (1) learning of MAC address of local network devices and (2) learning of MAC addresses of remote network devices via IS-IS message exchanges with other AEDs. Additionally, traditional OTV networks require a MAC address installation phase for the AEDs, where the address tables are generated by each AED. These processes are computationally intensive, may consume significant computing and network resources (e.g., bandwidth) and may take significant time to be performed.

As stated above, one or more of the AEDs in the overlay network 100 may experience a failure event. For example, edge device 2 in site S2, which is designated, e.g., a priori, as an AED, may experience a failure event, and another edge device may be designated as the new AED for site S2. The new AED takes over responsibility of routing traffic to network devices that are local to its site. For example, when edge device 2 experiences a failure (e.g., is removed from the overlay network 100 or is otherwise inoperable or is declassified from being an AED), edge device 106(1) ("edge device 1" or "E1") or edge device 106(3) ("edge device 3" or "E3") may be designated as the new AED in site S2. In traditional overlay networks, upon a failure event of an AED, the new AED reinitiates the two phases of the MAC address learning process (e.g., learning the MAC address of network devices local to it and advertising these local MAC addresses to AEDs of remote sites using the IS-IS protocol). That is, for example, if edge device 1 is designated as the new AED, upon failure of edge device 2, edge device 1 will learn the MAC addresses of the local network devices in site S2 and will send those MAC addresses to the AED of remote site S1 (edge device 4) via, e.g., an IS-IS message. Edge device 4, upon receiving the IS-IS message, would then reinstall all of these remote MAC addresses to generate the new address table. In traditional overlay networks, edge device 4 would install all of the remote MAC addresses, even though it previously had installed the MAC addresses sent to it by the IS-IS message previously sent by edge device 2 before the failure event. This results in a redundancy issue, where MAC addresses that are already known to edge device 4 are reinstalled by edge device 4 upon edge device 4 receiving the IS-IS message from the edge device 1 (the newly appointed AED for site S2).

These inefficiencies are exacerbated every time there is a change in an AED designation, and for an overlay network with many sites or subnetworks, the requirement for performing the two-phase MAC address learning and installation techniques for every AED reclassification/redesignation limits the scalability of traffic flow within complex networks. For example, in traditional overlay networks, while edge device 1 is learning the local MAC addresses of the network devices in site S2, edge device 4 may continue to send traffic destined for network devices in site S2 to edge device 2 (the previous AED of site S2 that has now experienced a failure event). Since edge device 2 has experience a failure event (e.g., a malfunction, removal or other event that renders edge device E2 inoperable) this traffic will be dropped or otherwise lost. This traffic loss problem can be rectified only when edge device 4 updates its address table to indicate that network devices in site S2 are now handled by edge device 1, and edge device 4 will update its address table only when it receives the message (e.g., the IS-IS message) from edge device 1 that lists the MAC addresses of network devices local to edge device 1. In the meantime, traffic may be dropped/lost or otherwise misrouted in the overlay network 100.

Thus, as these address learning processes take place, communication delays may result. For example, the total delay may include the time that it takes the new AED to learn the local MAC addresses, the time it takes the new AED to advertise the MAC addresses to remote AEDs and the time it takes remote AEDs to install updates to their address tables. These time delays are further exacerbated by potentially complex topologies of site S1 and S2 (or other sites in the overlay network not shown). Thus, the total traffic loss duration is large and non-deterministic and is impacted by the scale of the address table of edge devices.

The techniques presented herein alleviate these shortcomings in traditional overlay network environments. In particular, an indirection table is created and stored by edge devices, and specifically, AEDs of sites in the overlay network 100. As shown in FIG. 1A, in the steady-state (i.e., when there is traffic flow in the overlay network 100 without any failure events), edge device 4 (the AED for site S1) maintains an address table 202 and an indirection table 204. The address table 202 stores address information of network devices in the overlay network 100. For example, the address table 202 stores the MAC addresses of the network devices 108(1)-108(n) obtained using the address learning techniques described above. The address table 202 also associates each address entry with a site identifier that identifies the site in which the network device is located. The indirection table 204 stores the site identifiers and maps the site identifiers to edge devices that are designated as AEDs for the particular site. That is, instead of listing the AED for each address entry in the address table 202, edge device 4 simply lists a site identifier associated with each address entry and maintains the indirection table 204 separate from the address table 202 to map the site identifier with the AED for the site.

Thus, when traffic is sent from network device 108(2) destined for network device 108(1), router 106(5) in site S1 routes the traffic (e.g., layer 2 traffic) from network device 108(2) to edge device 4. Edge device 4 encapsulates the traffic (e.g., a layer 3 encapsulation), and looks up, in the address table 202, the MAC address that corresponds to the destination address of the traffic (i.e., the MAC address of network device 108(1)). Edge device 4 determines that the MAC address of network device 108(1) corresponds to the site identifier for S2. Edge device 4 then looks up, in the indirection table 204, the AED that is associated with the site identifier for site S2 and identifies edge device 2 as the AED for site S2. Edge device 4 then sends the encapsulated traffic to edge device 2, which decapsulates the packet and forwards it to router 106(6). Router 106(6) then forwards the packet to the destination network device 108(1).

Reference is now made to FIG. 1B. FIG. 1B shows the overlay network 100 with a failure event of an edge device. Specifically, FIG. 1B shows a failure event of edge device 2 at reference numeral 206. For example, edge device 2 may be removed from the overlay network 100, may be inoperable or may otherwise no longer be classified as the AED for site S2. In FIG. 1B, edge device 1 is activated and takes over routing responsibilities as the AED for site S2. That is, upon taking over for edge device 2, edge device 1 is responsible for decapsulating traffic received from edge device 4 and routing traffic to and from network devices in site S2. In one example, an election process may occur that ultimately designates edge device 1 as the new AED for site S2. For example, every edge device in site S2 may have a corresponding priority associated with it, and upon a failure of edge device 2 in site S2, the edge device with the highest priority (e.g., edge device 1 in this example) may be designated as the new AED. In this example, the priority information may identify a list of candidate edge devices that are configured to be responsible for routing traffic in site S2 upon the failure of edge device 2. Based on the priority information, one of the candidate edge devices may be selected to take over responsibility for routing traffic to network devices in site S2 upon the failure of edge device 2. This priority information may be made available to edge device 4 and other AEDs in the network to enable these AEDs to predicatively anticipate future AED designations in site S2 upon failure of edge device 2.

Upon edge device 2 experiencing the failure event and edge device 1 being designated as the new AED for site S2, edge device 1 sends a message 208 to edge device 4 in site S1 (and other AEDs of other sites not shown in the overlay network 100) indicating that it is now the AED for site S2. This message may be a fast flooding message that indicates the AED take over event by edge device 1. The fast flood message 208 may be, for example, an IS-IS message that is marked with a high/urgent priority, and thus may reach edge device 4 and other AEDs in the overlay network 100, more quickly with respect to other traffic sent in the overlay network 100.

It should be appreciated that when edge device 2 experiences the failure event, edge device 4 loses its adjacency to edge device 2. Typically, when any AED in the overlay network 100 loses its adjacency to another AED, the AED that loses its adjacency will also lose all information that was advertised to it by the other AED. That is, in the example in FIG. 1B, traditionally, when edge device 2 experiences the failure event, edge device 4 may lose or delete all of the address information advertised to it by edge device 2. Since it is undesirable for edge device 4 to lose this address information, edge device 4 delays the deletion of the MAC addresses that it received remotely from edge device 2. That is, edge device 4 may delay deletion of all MAC addresses it received remotely via IS-IS messages in order to provide the new AED (edge device 1) time to advertise the address information to it. The timeframe during which this deletion is delayed may be configurable. For example, edge device 4 may be provisioned to delay deletion for a predetermined period of time or may delay deletion for a time period that is sufficiently long in duration (e.g., using a best-guess analysis) to allow edge device 1 to readvertise the remote address information.

In one example, MAC addresses of network devices are advertised in a control plane. The MAC addresses are associated with a site in addition to a network device. The MAC addresses are not readvertised upon an edge device change or failure event in the overlay network. When the remote MACs are installed in an address table (e.g., a forwarding table) of an edge device, an indirection table is created. The site indirection points to the edge device at the remote site. When the edge device change occurs or if there is a failure event, a fast notification is generated and sent to remote sites. This fast notification is used to update the indirection table.

Reference is now made to FIG. 1C. FIG. 1C shows an example of the edge device 4 updating its indirection table to indicate that edge device 1 is now responsible for routing traffic within site S2 (i.e., that edge device 1 is the AED of site S2). As shown at reference numeral 210, upon receiving the fast flooding message 208 in FIG. 1B, edge device 4 updates its indirection table to indicate that edge device 1 is now the AED for site S2. Accordingly, network device 108(2) in site S1 may send traffic to network device 108(1) in site S2 via the edge device 4. Edge device 4 upon receiving the traffic originating from network device 108(2) encapsulates the traffic and looks up the MAC address for network device 108(1) in its address table. Edge device 4 determines the site identifier associated with this MAC address, and looks up (in the indirection table 204) the AED of the site corresponding to the site identifier. The indirection table 204 lists edge device 1 as the AED for site S2, and thus, edge device 4 sends the encapsulated traffic to edge device 1, which then decapsulates the traffic and routes it within site S2 to be sent to network device 108(1). Thus, edge device 4 is able to send traffic to the appropriate AED in site S2 immediately upon receiving the notification message (e.g., the fast flooding message 208) that edge device 1 is now the AED for site S2.

It should be appreciated that edge device 1 may still perform the address learning techniques described above, even though it is able to send and receive traffic to edge device 4. For example, even though edge device 4 is able to send traffic from site S1 to site S2, edge device 1 may later send an IS-IS message to edge device 4 that lists the MAC addresses local to edge device 1. Upon receiving the IS-IS message, edge device 4 can then update its address table 202 to update or otherwise modify any MAC address entries (e.g., if any devices have been added/removed or if MAC addresses have changed). However, the address entries in the address table 202 of edge device 4 will still map to site identifiers, and the site identifiers are mapped (in the indirection table 204) to AEDs responsible for sites.

It should be appreciated that if the sites have complex topologies (e.g., multipath networks, fully meshed networks, Transparent Interconnect of Lots of Links (TRILL), etc.) or if the sites are utilizing virtual Port Channel (vPC) implementations, devices in each site may learn the MAC address on all of the edge devices. In this example, only one device learns and advertises the local MAC address of the devices at a time. Additionally, it should be appreciated that the indirection table can possibly contain multiple edge devices that are possible "candidate" edge devices for take over in case of a failure event. In this example, if the primary edge device fails, the forwarding module can be made to quickly switch to one of the backup candidate edge devices that are already pre-programmed in hardware. This saves precious hardware write time within edge devices responsible for routing network traffic in the overlay network. In general, when using multi-path technologies, it is possible to have multiple AEDs in a network topology, and thus, the indirection table may include all functional AEDs and may exclude only those AEDs that have been reported as "failed." For example, all edge devices may be AEDs for unicast purposes, while for multicast purposes, only one edge device may be an AED.

Figure 2A:
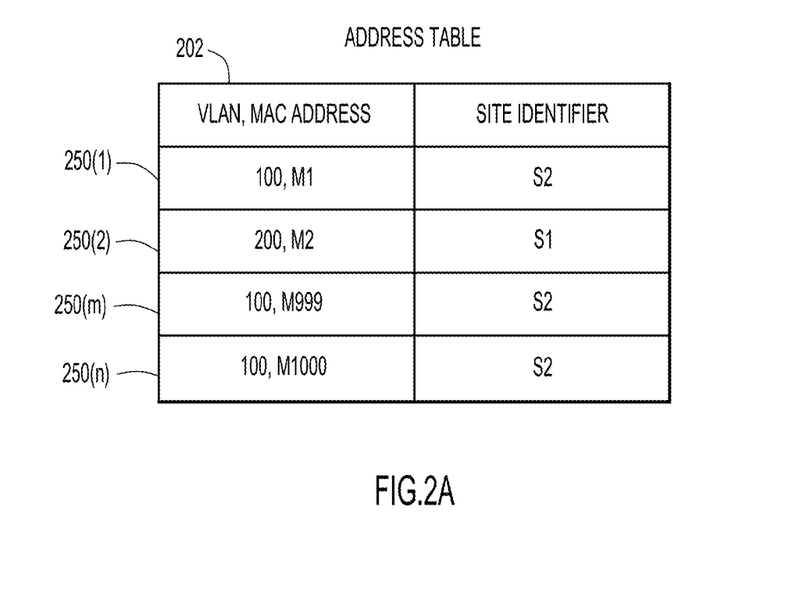
FIGS. 2A and 2B show examples of an address table and an indirection table configured to map edge devices to appropriate site identifiers and address identifiers.
Figure 2B:
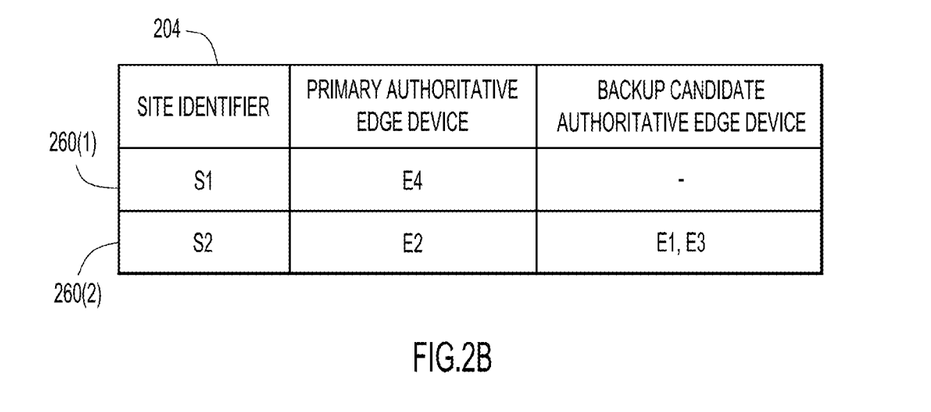

Reference is now made to FIGS. 2A and 2B. FIGS. 2A and 2B show examples of an address table and an indirection table configured to map edge devices to appropriate site identifiers and address identifiers. Specifically, FIG. 2A shows the address table 202 maintained by edge device 4. The address table lists the MAC address for network device 108(1), 108(2), 108(m) and 108(n) in the overlay network. The address table entry for network device 108(1) (MAC address "M1") is shown at reference numeral 250(1), the address table entry for network device 108(2) (MAC address "M2") is shown at reference numeral 250(2), the address table entry for network device 108(m) (MAC address "M999") is shown at reference numeral 250(m) and the address table entry for network device 108(n) (MAC address "M1000") is shown at reference numeral 250(n). The entries 250(1)-250(n) also list a virtual local area network (VLAN) in which the network devices reside. For example, the VLANs may identify the sites or subnetworks in which the network devices reside. As shown, each MAC address is mapped to a site identifier. Each address entry lists the next hop as a site identifier entry that identifies the site in which the network device resides. The site identifier in each address entry, in turn, points to the indirection table 204, which contains the actual forwarding device information. Thus, the address table 202 in FIG. 2A shows network devices 108(1), 108(m) and 108(n) mapped to a site identifier for site S2 while network device 108(2) is mapped to a site identifier for site S1 (the site in which edge device 4 resides).

In FIG. 2B, the indirection table 204 is shown, which maps the site identifiers for sites S1 and S2 to the AEDs associated with each site. As shown in entry 260(1), the site identifier for site S1 is mapped to edge device 4 as the primary AED for site S1. In entry 260(2), the site identifier for site S2 is mapped to edge device 2 as the primary AED for site S2. It should be appreciated that the entries in FIG. 2B may constitute two indirection tables, with entry 260(1) constituting a first indirection table being present on edge devices outside of site S1 and entry 260(2) constituting a second indirection being present on edge devices outside of site S2. Additionally, the site identifier for site S2 is mapped to edge device 1 and edge device 3 as backup or secondary candidate AEDs (in the case of a failure of edge device 2). Thus, in this example, edge device 4, which maintains the indirection table 204 in FIG. 2B, may immediately be aware that edge device 1 will be the new AED of site S2 upon failure of edge device 2. That is, the AED of site S1 (edge device 4) may receive priority information that indicates edge device 1 will be the new AED for site S2 before a failure event of edge device 2. Thus, edge device 4 may not need to wait for the notification (e.g., the fast flooding message 208) or any routing data from site S2 that the AED of site S2 has changed, since it already maintains a list of candidate edge devices (and priority orders) that indicate which edge device will take over AED responsibilities for site S2 upon failure of the primary AED.

In the instance of a failure event of an AED, the edge devices will advertise the subnetworks (or virtual Local Area Networks (VLANs)) in which they belong. The OTV control process (e.g., Intermediate System to Intermediate System (IS-IS) messages) marks the information as urgent and floods/processes it with priority. Since the size of this information is small relative to the order of number of subnetworks/VLANs, it is possible to advertise this information extremely fast by marking it urgent and giving it high priority in the OTV control process (IS-IS).

Figure 3:
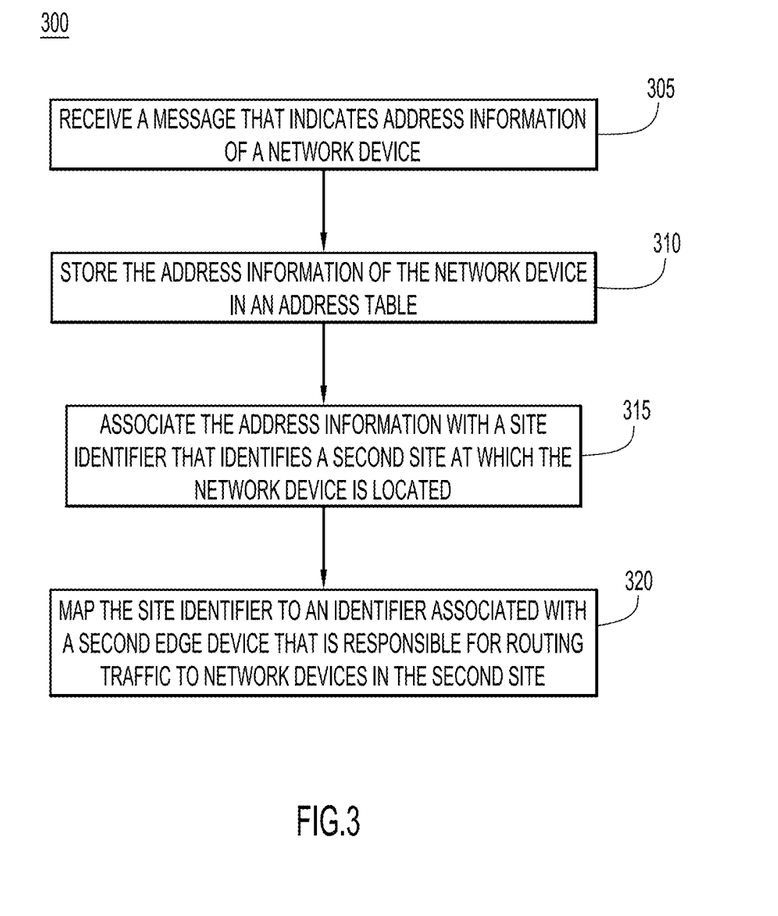
FIG. 3 shows an example flow chart depicting operations for performing the enhanced address learning and mapping processes.

Reference is now made to FIG. 3, which shows an example flow chart 300 depicting operations for performing the enhanced address learning and mapping processes. At 305, at a first edge device in a first site in a network, a message is received that indicates address information of a network device. At 310, the address information of the network device is stored in an address table, and at 315, the address information is associated with a site identifier that identifies a second site at which the network device is located. At 320, the site identifier is mapped to an identifier associated with a second edge device that is responsible for routing traffic to network devices at (in) the second site.

Figure 4:
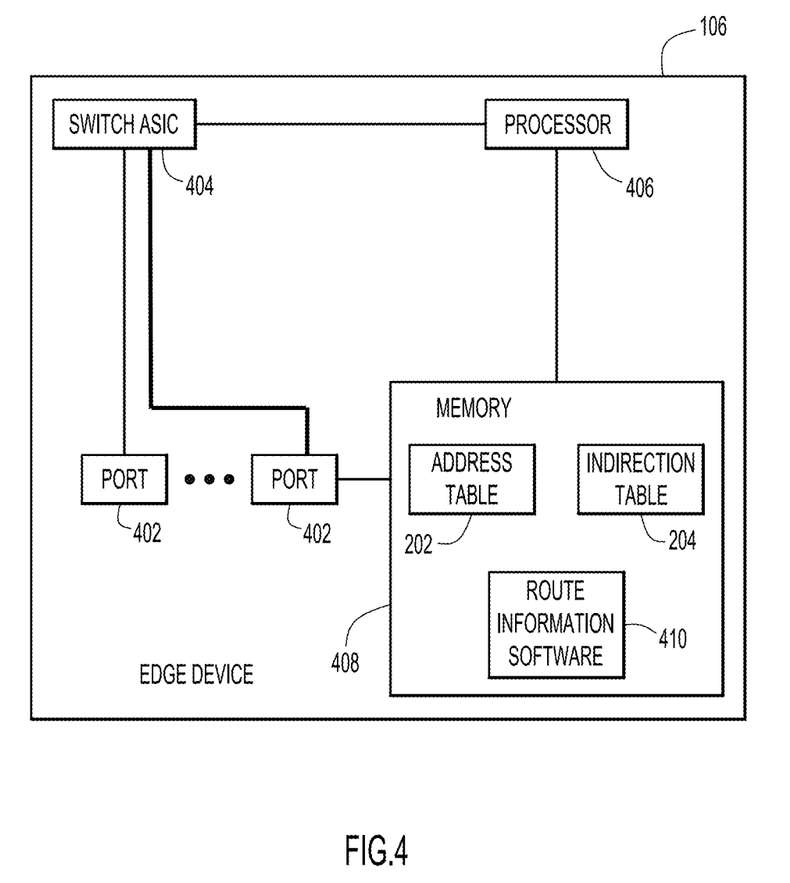
FIG. 4 shows an example block diagram of an edge device configured to perform the enhanced address learning and mapping processes.

Reference is now made to FIG. 4. FIG. 4 shows an example block diagram 106 of an edge device configured to perform the enhanced address learning and mapping processes. FIG. 4 shows the edge device generally at reference numeral 106, though it should be appreciated that the edge device 106 may be any edge device configured to operate as an AED and that is able to maintain the address table 202 and the indirection table 204. For example, edge device 106 may represent edge device 4 in FIGS. 1A-1C.

The edge device 106 is configured to participate in the enhanced steady-state traffic flow and to perform the enhanced address learning processes. The edge device 106 may be, e.g., a network router or switch device and is configured to route overlay traffic in a network between network devices. Additionally, the edge device 106 is configured to update its address table 202 and indirection table 204 in response to failure events, as described above.

The edge device 106 comprises, among other components, a plurality of ports 402, a switch application specific integrated circuit (ASIC) 404, a processor 406 and a memory 408. The ports 402 receive communications (e.g., frames) from devices in the overlay network 100 (e.g., from devices within a site or from device from other sites) and are configured to send communications to the devices. The ports 402 are coupled to the switch ASIC 404. The switch ASIC 404 receives instructions from the processor 406 and forwards communications to an appropriate one of the ports 402 for transmission to a destination network device. The switch ASIC 404 is coupled to the processor 406. The processor 406 is, for example, a microprocessor or microcontroller that is configured to execute program logic instructions (i.e., software) for carrying out various operations and tasks of the edge devices, as described above. For example, the processor is configured to execute route information software 410 to determine and distribute address information of network devices in response to failure events, according to the techniques described herein. The route information software 410 also instructs the processor 406 to update a route information database. The route information database, for example, comprises the address table 202 and the indirection table 204 shown in FIGS. 2A and 2B. The functions of the processor 406 may be implemented by logic encoded in one or more tangible computer readable storage media or devices (e.g., storage devices compact discs, digital video discs, flash memory drives, etc. and embedded logic such as an application specific integrated circuit, digital signal processor instructions, software that is executed by a processor, etc.).

The memory 408 may comprise read only memory (ROM), random access memory (RAM), magnetic disk storage media devices, optical storage media devices, flash memory devices, electrical, optical, or other physical/tangible (non-transitory) memory storage devices. The memory 408 stores software instructions for the route information software 410. Thus, in general, the memory 408 may comprise one or more computer readable storage media (e.g., a memory storage device) encoded with software comprising computer executable instructions and when the software is executed (e.g., by the processor) it is operable to perform the operations described for the route information software 410.

The route information software 410 may take any of a variety of forms, so as to be encoded in one or more tangible computer readable memory media or storage device for execution, such as fixed logic or programmable logic (e.g., software/computer instructions executed by a processor), and the processor 406 may be an ASIC that comprises fixed digital logic, or a combination thereof.

For example, the processor 406 may be embodied by digital logic gates in a fixed or programmable digital logic integrated circuit, which digital logic gates are configured to perform operations and processes of the route information software 410. In general, the route information software 410 may be embodied in one or more computer readable storage media encoded with software comprising computer executable instructions and when the software is executed operable to perform the operations described hereinafter.

It should be appreciated that the techniques described herein may be applicable to any layer 2 Virtual Private Network (VPN) with either a push or a pull protocol. For example, the techniques herein may be applicable to an Ethernet VPN with a Border Gateway Protocol (BGP) control plane or layer 2 Location Identifier Separation Protocol (LISP) control plane or Virtual Extensible Local Area Network (VXLAN) with a controller based control plane or Network Virtualization using Generic Routing Encapsulation (NVGRE) with a controller based control plane.

It should be appreciated that the techniques described above in connection with all embodiments may be performed by one or more computer readable storage media that is encoded with software comprising computer executable instructions to perform the methods and steps described herein. For example, the operations performed by the edge devices 106(1)-106(4) may be performed by one or more computer or machine readable storage media (non-transitory) or device executed by a processor and comprising software, hardware or a combination of software and hardware to perform the techniques described herein.

In summary, a method is provided comprising: at a first edge device located at a first site in a network, receiving a message that indicates address information of a network device; storing the address information of the network device in an address table; associating the address information with a site identifier that identifies a second site at which the network device is located; and mapping the site identifier to an identifier associated with a second edge device that is responsible for routing traffic to network devices at the second site.

In addition, a computer readable storage media is provided that is encoded with software comprising computer executable instruction and when the software is executed operable to: receive a message at a first site that indicates address information of a network device; store the address information of the network device in an address table; associate the address information with a site identifier that identifies a second site at which the network device is located; and map the site identifier to an identifier associated with a second edge device that is responsible for routing traffic to network devices at the second site.

Furthermore, an apparatus is provided comprising: a plurality of ports; a memory; and a processor coupled to the ports and the memory and configured to: receive a message at a first site that indicates address information of a network device; store the address information of the network device in an address table; associate the address information with a site identifier that identifies a second site at which the network device is located; and map the site identifier to an identifier associated with a second edge device that is responsible for routing traffic to network devices at the second site.

The above description is intended by way of example only.

What is claimed is:

1. A method comprising:
    at a first edge device located at a first site in an overlay network, receiving a message that indicates address information of a network device located at a second site of the overlay network;
    associating the address information with a site identifier that identifies the second site at which the network device is located;
    storing the address information and the associated site identifier in an address table at the first edge device;
    mapping the site identifier to a device identifier associated with a second edge device that is an authoritative edge device for the second site and that is responsible for routing traffic to network devices at the second site; and
    storing the site identifier and the associated device identifier for the second edge device in an indirection table at the first edge device,
    wherein the indirection table is separate from the address table.

2. The method of claim 1, further comprising:
receiving a notification message that indicates that a third edge device has replaced the second edge device as the authoritative edge device for the second site and is now responsible for routing traffic to the network devices at the second site; and
updating the indirection table so as to map the site identifier to a device identifier associated with the third edge device.

3. The method of claim 2, further comprising sending traffic ultimately destined for the network device to the third edge device based on the updated indirection table without waiting to receive routing data from the third edge device.

4. The method of claim 3, wherein sending comprises sending the traffic without receiving a message from the third edge device advertising address information of network devices at the second site.

5. The method of claim 2, further comprising delaying removal of the address information in the address table in response to determining that the third edge device has taken over responsibility for routing traffic to the network devices at the second site.

6. The method of claim 2, wherein receiving the notification comprises receiving the notification marked as an urgent message in accordance with the Intermediate System-to-Intermediate System protocol.

7. The method of claim 1, further comprising:
storing priority information for each of a plurality of candidate edge devices that may be selected as an authoritative edge device for the second site upon a failure of the second edge device, wherein the priority information is a relative ranking of the ability of the candidate edge devices to be responsible for routing traffic in the second site;
selecting based on the priority information one of the candidate edge devices to replace the second edge device as the authoritative edge device for the second site upon a failure of the second edge device; and
updating the indirection table to map the site identifier to an identifier associated with the selected candidate edge device.

8. The method of claim 1, further comprising:
receiving, at the first edge device, traffic to be sent to the network device;
performing a look-up in the address table to identify the address information and site identifier associated with the network device, wherein the site identifier operates as a next hop pointer to the indirection table;
based on the site identifier, performing a lookup in the indirection table to determine that the second edge device is the authoritative edge device for the second site; and
sending the traffic to the second edge device.

9. One or more non-transitory computer readable storage media encoded with software comprising computer executable instruction and when the software is executed operable to:
receive a message at a first edge device located at a first site in an overlay network, wherein the message indicates address information of a network device located at a second site of the overlay network;
associate the address information with a site identifier that identifies the second site at which the network device is located;
store the address information and the associated site identifier in an address table at the first edge device;
map the site identifier to a device identifier associated with a second edge device that is an authoritative edge device for the second site and that is responsible for routing traffic to network devices at the second site; and
store the site identifier and the associated device identifier for the second edge device in an indirection table at the first edge device,
wherein the indirection table is separate from the address table.

10. The non-transitory computer readable storage media of claim 9, further comprising instructions operable to:
receive a notification message that indicates that a third edge device has replaced the second edge device as the authoritative edge device for the second site and is now responsible for routing traffic to the network devices at the second site; and
update the indirection table so as to map the site identifier to a device identifier associated with the third edge device.

11. The non-transitory computer readable storage media of claim 10, further comprising instructions operable to send traffic ultimately destined for the network device to the third edge device based on the updated mapping without waiting to receive routing data from the third edge device.

12. The non-transitory computer readable storage media of claim 11, wherein the instructions operable to send the traffic comprise instructions operable to send the traffic without receiving a message from the third edge device advertising address information of network devices at the second site.

13. The non-transitory computer readable storage media of claim 10, further comprising instructions operable to:
receive, at the first edge device, traffic to be sent to the network device;
perform a look-up in the address table to identify the address information and site identifier associated with the network device, wherein the site identifier operates as a next hop pointer to the indirection table;
based on the site identifier, perform a lookup in the indirection table to determine that the second edge device is the authoritative edge device for the second site; and
send the traffic to the second edge device.

14. The non-transitory computer readable storage media of claim 9, further comprising instructions operable to:
store priority information for each of a plurality of candidate edge devices that may be selected as an authoritative edge device for the second site upon a failure of the second edge device, wherein the priority information is a relative ranking of the ability of the candidate edge devices to be responsible for routing traffic in the second site;
select based on the priority information one of the candidate edge devices to replace the second edge device upon a failure of the second edge device; and
update the indirection table to map the site identifier to an identifier associated with the selected candidate edge device.

15. An apparatus located at a first site in an overlay network, comprising:
a plurality of ports;
a memory; and
a processor coupled to the ports and the memory, and configured to:
receive a message that indicates address information of a network device located at a second site of the overlay network;

associate the address information with a site identifier that identifies the second site at which the network device is located;

map the site identifier to a device identifier associated with a second edge device that is an authoritative edge device for the second site and that is responsible for routing traffic to network devices at the second site; and store the site identifier and the associated device identifier for the second edge device in an indirection table at the first edge device, wherein the indirection table is separate from the address table.

16. The apparatus of claim 15, wherein the processor is further configured to:

receive a notification message that indicates that a third edge device has replaced the second edge device as the authoritative edge device for the second site and is now responsible for routing traffic to the network devices at the second site; and update the indirection table so as to map the site identifier to an identifier associated with the third edge device.

17. The apparatus of claim 16, wherein the processor is further configured to send traffic ultimately destined for the network device to the third edge device based on the updated indirection table without waiting to receive routing data from the third edge device.

18. The apparatus of claim 15, wherein the processor is further configured to receive, at the first edge device, traffic to be sent to the network device;

perform a look-up in the address table to identify the address information and site identifier associated with the network device, wherein the site identifier operates as a next hop pointer to the indirection table;

based on the site identifier, perform a lookup in the indirection table to determine that the second edge device is the authoritative edge device for the second site; and send the traffic to the second edge device.

19. The apparatus of claim 16, wherein the processor is further configured to delay removal of the address information in the address table in response to determining that the third edge device has taken over responsibility for routing traffic to the network devices at the second site.

20. The apparatus of claim 15, wherein the processor is further configured to:

store priority information for each of a plurality of candidate edge devices that may be selected as an authoritative edge device for the second site upon a failure of the second edge device, wherein the priority information is a relative ranking of the ability of the candidate edge devices to be responsible for routing traffic in the second site;

select based on the priority information one of the candidate edge devices to replace the second edge device as the authoritative edge device for the second site upon a failure of the second edge device; and update the indirection table to map the site identifier to an identifier associated with the selected candidate edge device.

* * * * *